United States Patent
Park

(10) Patent No.: US 9,764,232 B2
(45) Date of Patent: Sep. 19, 2017

(54) SYSTEM FOR SHOWING IMAGE HAVING GAME FUNCTION

(71) Applicant: CJ 4D PLEX CO., LTD., Seoul (KR)

(72) Inventor: Sang Hee Park, Seoul (KR)

(73) Assignee: CJ 4D PLEX CO., LTD., Seoul (KR)

( * ) Notice: Subject to any disclaimer, the term of this patent is extended or adjusted under 35 U.S.C. 154(b) by 390 days.

(21) Appl. No.: 14/353,468

(22) PCT Filed: Jan. 29, 2013

(86) PCT No.: PCT/KR2013/000688
§ 371 (c)(1),
(2) Date: Apr. 22, 2014

(87) PCT Pub. No.: WO2013/125797
PCT Pub. Date: Aug. 29, 2013

(65) Prior Publication Data
US 2014/0277771 A1    Sep. 18, 2014

(30) Foreign Application Priority Data
Feb. 20, 2012    (KR) .......................... 10-2012-0016889

(51) Int. Cl.
*A63F 13/28*    (2014.01)
*G05B 13/02*    (2006.01)
(Continued)

(52) U.S. Cl.
CPC ............... *A63F 13/28* (2014.09); *A63J 25/00* (2013.01); *G05B 13/02* (2013.01); *A47C 1/00* (2013.01);
(Continued)

(58) Field of Classification Search
CPC ...... G09B 7/07; A47C 1/00; A47C 1/12–1/13; G05B 13/02; G05B 15/02;
(Continued)

(56) References Cited

U.S. PATENT DOCUMENTS 5,429,369 A * 7/1995 Hurst ...................... A63F 7/045
                                                          273/243
5,992,853 A * 11/1999 Rudell ...................... A63F 9/18
                                                          273/148 R
(Continued)

FOREIGN PATENT DOCUMENTS

JP           2003-114111 A    4/2003
KR    10-2003-0031956 A    4/2003
(Continued)

OTHER PUBLICATIONS

Anonymous, "Motion & Sensation Effects", Simnoa Technologies Ltd. [online], 2010 [retrieved May 11, 2016], Retrieved from Internet: <URL: https://web.archive.org/web/20100713072814/ http://www.simnoa.com/motion%20seat%20features.htm>, pp. 1-2.*

(Continued)

*Primary Examiner* — Todd Aguilera
(74) *Attorney, Agent, or Firm* — Plumsea Law Group, LLC

(57) ABSTRACT

The present invention relates to a system for showing an image, and more particularly, to a system for showing an image having a game function of performing an interactive game for viewers in a theater. To this end, the present invention provides a system for showing an image, including: a plurality of motion chair assemblies including a predetermined number of motion chairs; a center server configured to control the motion chair assembly; and a screen configured to display an image output from the center server, in which a signal generated in the motion chair assembly is transmitted to the center server according to an image displayed on the screen, and when the generated signal does not accord with a preset condition, the center server operates the motion chair assembly, and when the (Continued)

generated signal accords with the preset condition, the center server does not operate the motion chair assembly.

4 Claims, 4 Drawing Sheets

(51) Int. Cl.
*A63J 25/00* (2009.01)
*A47C 1/12* (2006.01)
*A47C 1/00* (2006.01)

(52) U.S. Cl.
CPC ......... *A47C 1/12* (2013.01); *A63F 2250/0428* (2013.01)

(58) Field of Classification Search
CPC . G05B 2219/40133–2219/40134; A63J 25/00; A63J 99/00; A63F 13/20–13/30; A63F 2250/64–2250/645; A63F 2300/10–2300/1068; A63F 2250/04–2250/0428; A63F 2250/05; G07F 17/32–17/3239; G07F 17/326–17/3286
See application file for complete search history.

(56) References Cited

U.S. PATENT DOCUMENTS

| | | | | |
|---|---|---|---|---|
| 6,220,965 | B1 * | 4/2001 | Hanna | A63G 7/00 463/52 |
| 7,140,962 | B2 * | 11/2006 | Okuda | A63F 13/10 463/2 |
| 8,113,517 | B2 * | 2/2012 | Canterbury | G07F 17/32 273/138.1 |
| 8,663,019 | B2 * | 3/2014 | Lesley | G07F 17/32 273/148 B |
| 8,684,807 | B1 * | 4/2014 | Crici | A63F 13/795 434/322 |
| 2004/0009798 | A1 * | 1/2004 | Okuda | A63F 13/10 463/7 |
| 2004/0158865 | A1 * | 8/2004 | Kubler | G06Q 30/02 725/82 |
| 2006/0068917 | A1 * | 3/2006 | Snoddy | A63F 13/12 463/42 |
| 2008/0054561 | A1 * | 3/2008 | Canterbury | G07F 17/32 273/148 B |
| 2008/0214273 | A1 * | 9/2008 | Snoddy | A63F 13/12 463/19 |
| 2008/0297997 | A1 * | 12/2008 | Anderson | A47C 1/12 361/679.02 |
| 2011/0111839 | A1 * | 5/2011 | Lesley | G07F 17/32 463/25 |
| 2011/0319180 | A1 * | 12/2011 | Lee | A47C 1/121 472/75 |
| 2013/0005442 | A1 * | 1/2013 | Erickson | G07F 17/3216 463/25 |

FOREIGN PATENT DOCUMENTS

| | | |
|---|---|---|
| KR | 2003629230000 Y1 | 9/2004 |
| KR | 2003838280000 Y1 | 5/2005 |
| KR | 1010053200000 B1 | 1/2011 |
| KR | 101762630000 A | 10/2011 |

OTHER PUBLICATIONS

International Search Report mailed Mar. 13, 2013 in PCT/KR2013/000688.

* cited by examiner

1. What words are written on a blackboard by the teacher in <the last lesson> of Alphose Daude?

① Free from oppression of ENGLAND
② I love you
③ Hurray for FRANCE
④ National prosperity and military power

SYSTEM FOR SHOWING IMAGE HAVING GAME FUNCTION

CROSS REFERENCE TO RELATED APPLICATION

This application is a US National Stage of International Application No. PCT/KR2013/000688 filed Jan. 29, 2013, which claims priority to Korean Patent Application No. 10-2012-0016889 filed Feb. 20, 2012, the contents of all of which are incorporated herein by reference in their entity.

FIELD OF THE INVENTION

The present invention relates to a system for showing an image, and more particularly, to a system for showing an image having a game function capable of performing an interactive game for viewers in a theater.

BACKGROUND

Facilities, such as a theater or a movie theater, for showing a moving image (or a movie), show only a moving image to viewers in the related art, but recently provide viewers with various effects together with showing an image.

When a movie theater for showing a general moving image is called a two-dimensional (2D) movie theater, and a movie theater for showing a stereophonic image (or, a specially photographed image) so that a viewer may feel a three-dimensional effect when the viewer views the image is called a three-dimensional (3D) movie theater, a movie theater for stimulating the sense of touch, the sense of smell, and the like, in addition to the senses of sight and hearing, so that a viewer may view an image while experiencing with the five senses is called a four-dimensional (4D) movie theater.

In a 4D movie theater, a motion base for moving a chair on which a viewer sits is installed under the chair, and a special effect device for providing a viewer with various effects is installed in the chair, and an internal wall or a ceiling of the movie theater.

When a viewer views a movie while sitting on the chair, the viewer does not simply view an image, but directly feels the effects, such as a motion, water, wind, smoke, flash, and heat, synchronized with the image, so that interests and immersion in the movie may be improved.

A motion chair and a special effect device installed in a currently operated 4D movie theater are only used for providing viewers with the five senses experience during the playing of a movie. However, it is necessary to use a pre-installed motion chair and special effect device for other usages in order to increase interests of viewers and induce more viewers to a 4D movie theater, as well as give the basic five senses experience and view of a 4D movie theater, and a development and research therefor has been essentially demanded.

SUMMARY

The present invention is conceived for the aforementioned necessity, and an object of the present invention is to provide a system for showing an image, which may induce more viewers to attend a 4D movie theater by providing viewers with new and fresh interests, in addition to the five senses experience and view in the 4D movie theater.

Another object of the present invention is to provide a system for showing an image capable of performing an interactive game, which may induce interests and funs of viewers and improve a degree of concentration of viewers in a 4D movie theater.

To this end, according to the present invention, a system for providing contents, comprising: a screen configured to display the contents; a motion chair assembly including at least two of motion chairs each of which generates a signal according to the contents displayed on the screen; and a server configured to operate the motion chair assembly if the signals generated by all of the motion chairs in the motion chair assembly are not equal, or if any one of the signals generated by all of the motion chair assembly is not received within a preset time.

Further, according to the present invention, a system for providing contents, comprising: a screen configured to display the contents; a first motion chair assembly including at least two of motion chairs each of which generates a signal according to the contents displayed on the screen and a module for providing a special effect; a second motion chair assembly including at least two of motion chairs each of which generates the signal according to the contents displayed on the screen; and a server configured to operate the module of the first motion chair assembly if the signals generated by all of the motion chairs in the second motion chair assembly are not equal, or if any one of the signals generated by all of the motion chairs in the second motion chair assembly is not received within a preset time.

According to the present invention, it is possible to perform an interactive game by using a motion chair and a special effect device for viewers before the playing of a movie in a 4D movie theater, so that there is an effect of inducing more viewers to the 4D movie theater by providing viewers of a movie with fresh interests and funs.

Especially, a 4D movie theater may provide viewers with new services which have not existed before by using a pre-installed motion chair and special effect device as it is without additional costs, thereby achieving an effect of efficiently increasing profitability of the movie theater.

DETAILED DESCRIPTION

Figure 1:
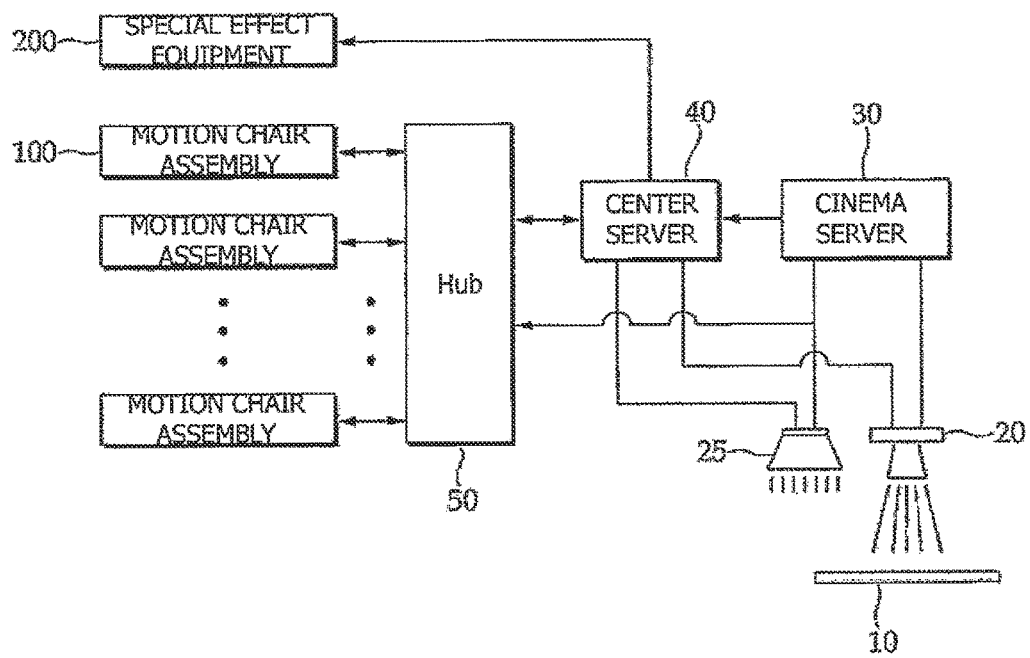
FIG. 1 is a schematic configuration diagram of a system for showing an image having a game function according to an exemplary embodiment of the present invention.

Hereinafter, an exemplary embodiment according to the present invention will be described in detail with reference to the accompanying drawings. A configuration of the present invention and a resultant operation effect will be clearly understood through the detailed description below. In the following description, the same elements will be designated by the same reference numerals although they are shown in different drawings, and a detailed explanation of known related functions and constitutions may be omitted so as to avoid unnecessarily obscuring the subject matter of the present invention.

FIG. 1 is a schematic configuration diagram of a system for showing an image having a game function according to an exemplary embodiment of the present invention.

Referring to FIG. 1, the system for showing the image includes a screen 10, a projector 20, a cinema server 30, a center server 40, a hub 50, a plurality of motion chair assemblies 100, special effect equipment 200 installed on an internal wall or a ceiling of a facility for showing the image, and the like.

The cinema server 30 deciphers encryption of a digital cinema package (DCP) that is a movie file received from a movie company and reproduces the DCP when showing a movie. An image signal reproduced in the cinema server 30 is projected on the screen 10 through the projector 20, and a voice signal is output through a speaker 25.

The cinema server 30 transmits a time code to the center server 40 while reproducing the movie file, and the center server 40 transmits a motion code and a special effect code corresponding to the time code to the respective motion chair assemblies 100 through the hub 50. The motion code and the special effect code are called a 4D code together.

Further, the center server 40, as a server, also transmits the special effect code to the special effect equipment 200. The special effect equipment 200 is referred to a device capable of providing an effect of wind, fog, bubble, fragrance, flash, and the like. A device for generating fog or bubbles may be installed in front of the screen 10, and a device for generating wind, flash, or fragrance may be installed on a ceiling or an upper wall surface of the facility for showing the image.

Figure 2:
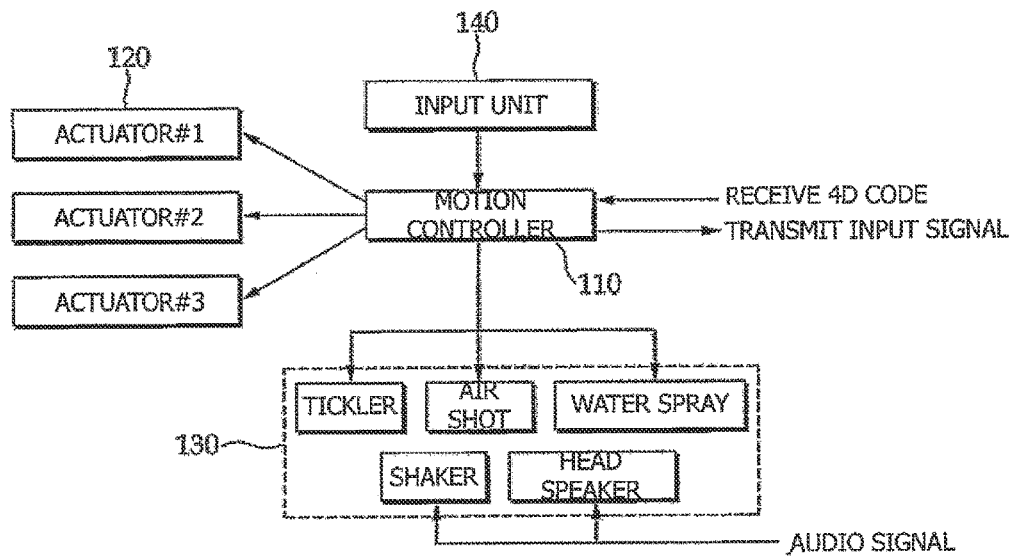
FIG. 2 is a schematic internal configuration diagram of a motion chair assembly according to an exemplary embodiment of the present invention.

FIG. 2 is a schematic internal configuration diagram of the motion chair assembly according to the exemplary embodiment of the present invention.

Referring to FIG. 2, the motion chair assembly 100 includes a motion controller 110, an actuator 120, a special effect module 130, an input unit 140, and the like.

The motion chair assembly 100 mechanically includes a predetermined number of motion chairs. For example, one motion chair assembly may include four motion chairs in the exemplary embodiment of the present invention. The four motion chairs are installed on a motion base to move according to an operation of the motion base.

The motion controller 110 controls operations of the actuator 120 and the special effect module 130 by receiving the 4D code from the center server 40.

The motion controller 110 controls the actuator 120 by using the motion code. The actuator 120 provides a viewer sitting on the chair with a motion feeling by moving the motion chair assembly 100. The number of actuators 120 is determined according to a degree of freedom of motion. In the exemplary embodiment of the present invention, three actuators #1, #2, and #3 are used by adopting three degrees of freedom.

The motion controller 110 controls a tickler, an air shot, and a water spray, which are constituent elements of the special effect module 130, by using the special effect code. The tickler provides an effect of tapping on or touching a leg, a back, or a hip of a viewer, the air shot discharges compressed air to a face, a neck, and the back side of a head of a viewer, and the water spray sprays water to a viewer by a spray method, so that the viewer may feel various special effects while viewing a movie.

Further, a perceptual vibration according to sound may be provided to the viewer by controlling a shaker through an audio signal output from the cinema server 30 independently from the motion controller 110, and vivid sound may be provided to the viewer through a head speaker independently from a speaker installed inside the theater.

The special effect module 130, as a module, is installed in each motion chair of the motion chair assembly 100, and the tickler may be installed in a foot rest, a seat, a backrest, and the like of the motion chair, the air shot may be installed at a portion of the backrest with which a neck is brought into contact or at the back side of the backrest, and the water spray may be installed at a back portion of the motion chair so that water may be sprayed toward the face of the viewer.

The system for showing the image according to the exemplary embodiment of the present invention may provide a viewer with various interactive games by including the input unit 140 in the motion chair assembly 100, as well as provide the viewer with a 4D effect through the motion chair assembly 100 when showing the movie.

The center server 40 may output an image and a voice by processing internally stored data, as well as perform a function of receiving the time code from the cinema server 30 and transmitting the 4D code corresponding to the time code to each motion chair assembly 100 when showing the movie.

That is, the center server 40 stores data, such as an advertisement, a preview, an announcement, and the like, and reproduces the data and provides the viewer with the data before the showing of the movie, and in the exemplary embodiment of the present invention, game contents are stored in the center server 40 and an interactive game is provided to the viewer under the control of the center server 40.

The interactive game may include various games, but in the exemplary embodiment of the present invention, a quiz game and a quickness test game will be described as an example.

Figure 3:
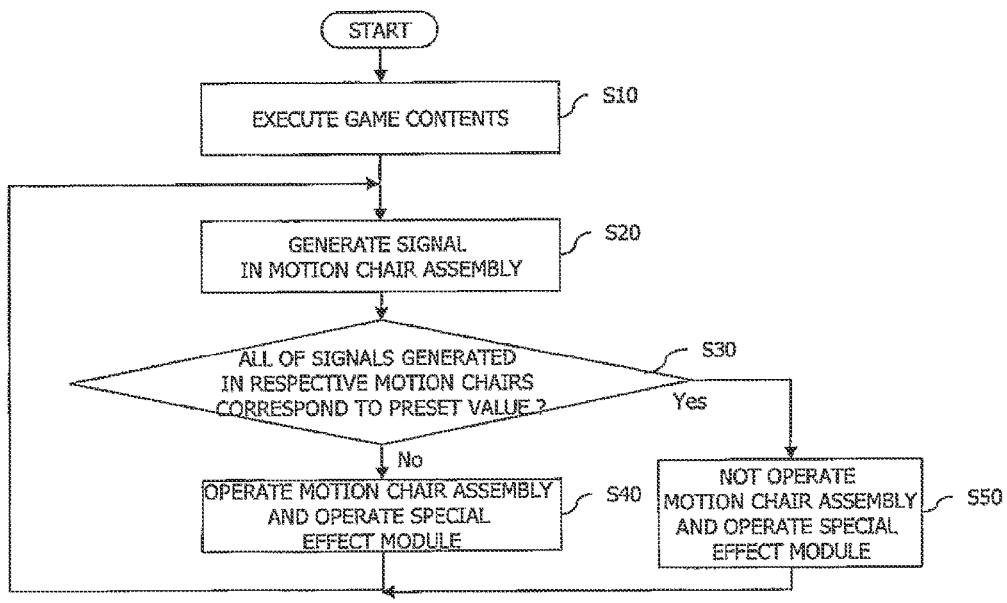
FIG. 3 is a process flowchart of a game progress in a system for showing an image according to an exemplary embodiment of the present invention.

FIG. 3 is a process flowchart of a game progress in the system for showing the image according to the exemplary embodiment of the present invention, and it is assumed that the game is a correct answer game, such as a quiz game.

Referring to FIG. 3, the center server 40 first executes internally stored game contents (S 10), a game image is displayed on the screen 10 through the projector 20 according to the execution of the game contents, and a sound according to the game is output through the speaker 25. For example, when a quiz game is executed, an image illustrated in FIG. 5 may be displayed on the screen 10.

The viewer participates in the game according to a guidance of a game method while viewing the game image displayed on the screen 10. The viewer generates a signal corresponding to the game by operating the input unit 140 included in the motion chair assembly 100 (S20). The input unit 10 may include a button, a joystick, and the like, and may be installed at an armrest portion of each motion chair.

The viewer views a quiz displayed on the screen 10, thinks of a correct answer, and inputs a number corresponding to the correct answer by operating the button or the joystick of the input unit 10.

When the viewer sitting on each motion chair of the motion chair assembly 100 inputs the correct answer through the input unit 10 installed in the armrest, a signal generated in each motion chair is transmitted to the center server 40. The center server 40 receives a signal for each motion chair assembly and determines whether the signals of the respective motion chairs correspond to a preset value (S30).

That is, in a case where the correct answer of the corresponding quiz is No. 3, when it is determined that all of the signals received from the certain motion chair assembly 100 correspond to No. 3, the center server 40 does not operate the motion chair assembly and the special effect module (S50). On the contrary, when it is determined that even any one of the signals received from the certain motion chair assembly 100 does not correspond to No. 3, the center server 40 may operate the motion chair assembly, or may operate all of the motion chair assembly and the special effect module (S40).

Here, in a case where the special effect module is operated, when the special effect module 130, such as the water spray or the air shot, is installed at the back portion of the motion chair, a person hit by water or air discharged from the water spray or the air shot is a person sitting on the motion chair positioned in the direct back side, so that a control target is not the special effect module of the motion chair generating the signal, but the special effect module of the motion chair positioned in the direct front side.

Namely, when a signal generated in each motion chair of a first motion chair assembly is different from a preset value, the center server operates the first motion chair assembly generating the signal, and operates a special effect module of a second motion chair assembly positioned in front of the first motion chair assembly. As described above, any one of the viewers sitting on the motion chair assembly inputs a different answer from the correct answer of the quiz, all people sitting on the motion chair assembly receive water or air discharged from the front motion chair assembly as a penalty. Accordingly, the viewers may be immersed in the game and interests of the viewers may be induced.

Figures 4, 5:
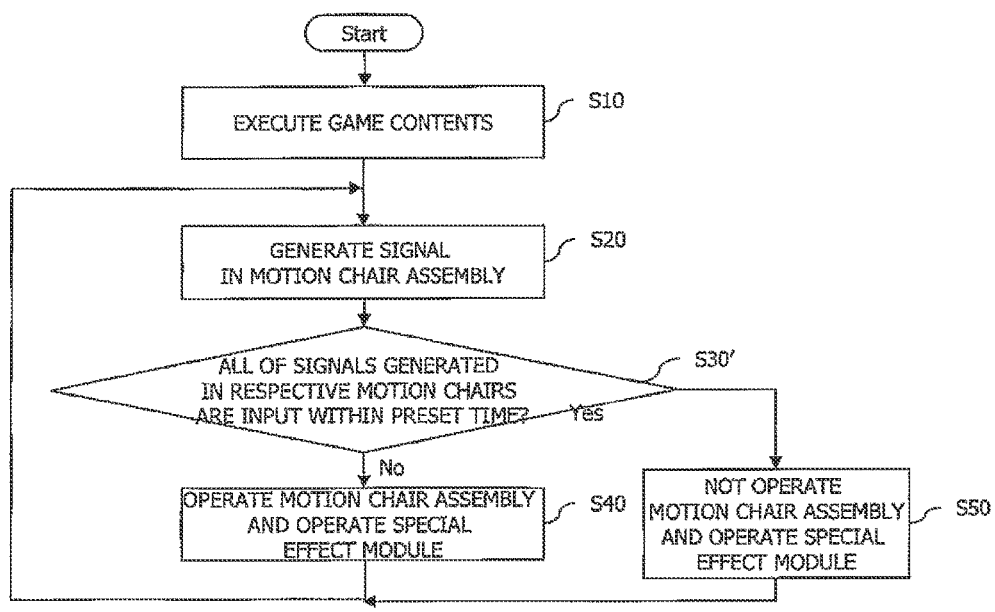
FIG. 4 is a process flowchart of a game progress in a system for showing an image according to another exemplary embodiment of the present invention.
FIG. 5 is a diagram illustrating a game related image displayed on a screen according to an exemplary embodiment of the present invention.

FIG. 4 is a process flowchart of a game progress in a system for showing an image according to another exemplary embodiment of the present invention, and it is assumed that a game is a quickness test game demanding an immediate response after watching an image.

Referring to FIG. 4, the center server 40 first executes internally stored game contents (S10), a game image is displayed on the screen 10 through the projector 20 according to the execution of the game contents, and a sound according to the game is output through the speaker 25. For example, when a quickness test game is executed, an image illustrated in FIG. 6 may be displayed on the screen 10.

Figure 6:
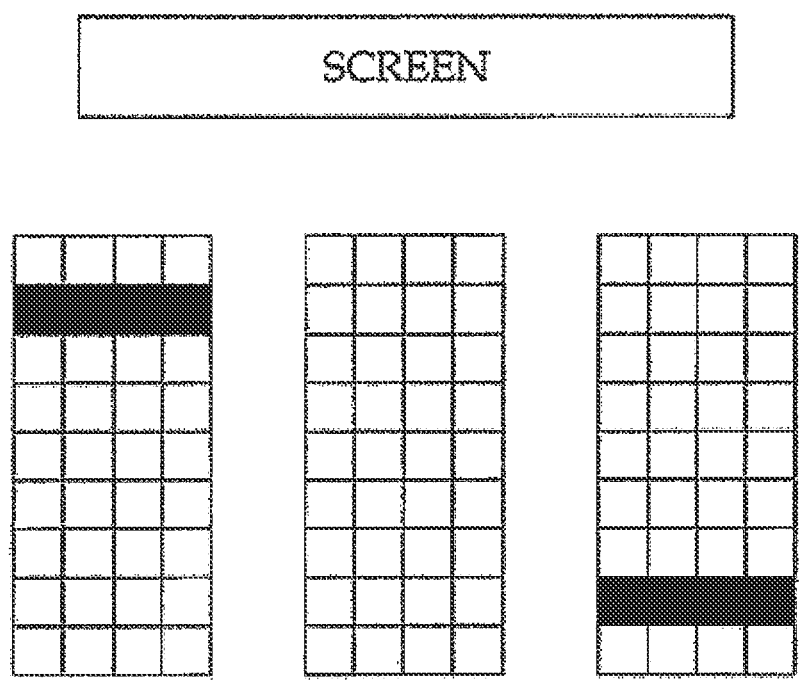
FIG. 6 is a diagram illustrating a game related image displayed on a screen according to another exemplary embodiment of the present invention.

Referring to the image of FIG. 6, it can be seen that a seating chart of the system for showing the image on which viewers sit is displayed, and specific seats are displayed with different colors in the seating chart.

In the quickness test game, when certain seats flickers with a different color in the seating chart, all of the viewers sitting on the certain seat may avoid a penalty by pressing the button or moving the joystick included in the chair within a predetermined time. When any one of the viewers sitting on the selected seats makes a late response, the motion chair assembly is moved or the special effect module is operated, so that all people sitting on the corresponding motion chair assembly may receive the penalty. In order to add funs of the game, the multiple seats flickering with a different color may be simultaneously displayed in the seating chart, and may be changed at a fast speed.

When the viewer sitting on each motion chair of the motion chair assembly 100 immediately makes a response after watching the screen and operates the input unit 10 installed in the armrest, a signal generated in each motion chair is transmitted to the center server 40. The center server 40 receives a signal for each motion chair assembly and determines whether the signals of the respective motion chairs are input within a preset time (S30').

That is, in a case where a response time, at which the viewer makes the input after watching the screen, is 0.1 second, when it is determined that the signals received from the certain motion chair assembly 100 are all input within 0.1 second, the center server 40 does not operate the motion chair assembly and the special effect module (S50).

On the contrary, when it is determined that even any one of the signals received from the certain motion chair assembly 100 is input in 0.1 seconds, the center server 40 may operate the motion chair assembly, or may operate all of the motion chair assembly and the special effect module (S40).

From the foregoing, it will be appreciated that various embodiments of the present invention have been described herein for purposes of illustration, and that various modifications may be made without departing from the scope and spirit of the present invention.

The exemplary embodiments disclosed in the specification of the present invention will not limit the present invention. The scope of the present invention will be interpreted by the claims below, and it will be construed that all techniques within the scope equivalent thereto belong to the scope of the present invention.

The invention claimed is:

1. A system for providing contents, comprising:
   a screen configured to display the contents;
   a first motion chair assembly including at least two motion chairs each of which generates a signal according to the contents displayed on the screen, wherein each of the motion chairs comprises a module for providing a special effect;
   a second motion chair assembly including at least two motion chairs each of which generates the signal according to the contents displayed on the screen; and
   a server configured to operate all of the modules for providing a special effect of the first motion chair assembly if only one of the signals generated by all of the motion chairs in the second motion chair assembly is not correct, or if only one of the signals generated by all of the motion chairs in the second motion chair assembly is not received within a preset response time, wherein said operation of all of the modules for providing a special effect provides all people seated on the second motion chair assembly with the special effect;
   wherein the first motion chair assembly is positioned in front of the second motion chair assembly.

2. The system of claim 1, wherein the first motion chair assembly and the second motion chair assembly further comprise:
   an input unit generating a signal;
   a plurality of actuators providing a viewer sitting on a chair with a motion feeling by moving the first motion chair assembly and the second motion chair assembly;
   a motion controller controlling operations of the plurality of actuators and the module by receiving an actuating signal from the server responding to the signal generated by the input unit.

3. The system of claim 1, wherein the module includes at least one of a tickler, an air shot, and a water spray.

4. The system of claim 3, wherein the module includes the tickler, the air shot, and the water spray, the tickler is installed in a foot rest, a seat and a backrest of a motion chair, the air shot is installed at a portion of the backrest with which a neck is brought into contact or at the back side of the backrest, and the water spray is installed at a back portion of the motion chair.

* * * * *